Patented Feb. 17, 1925.

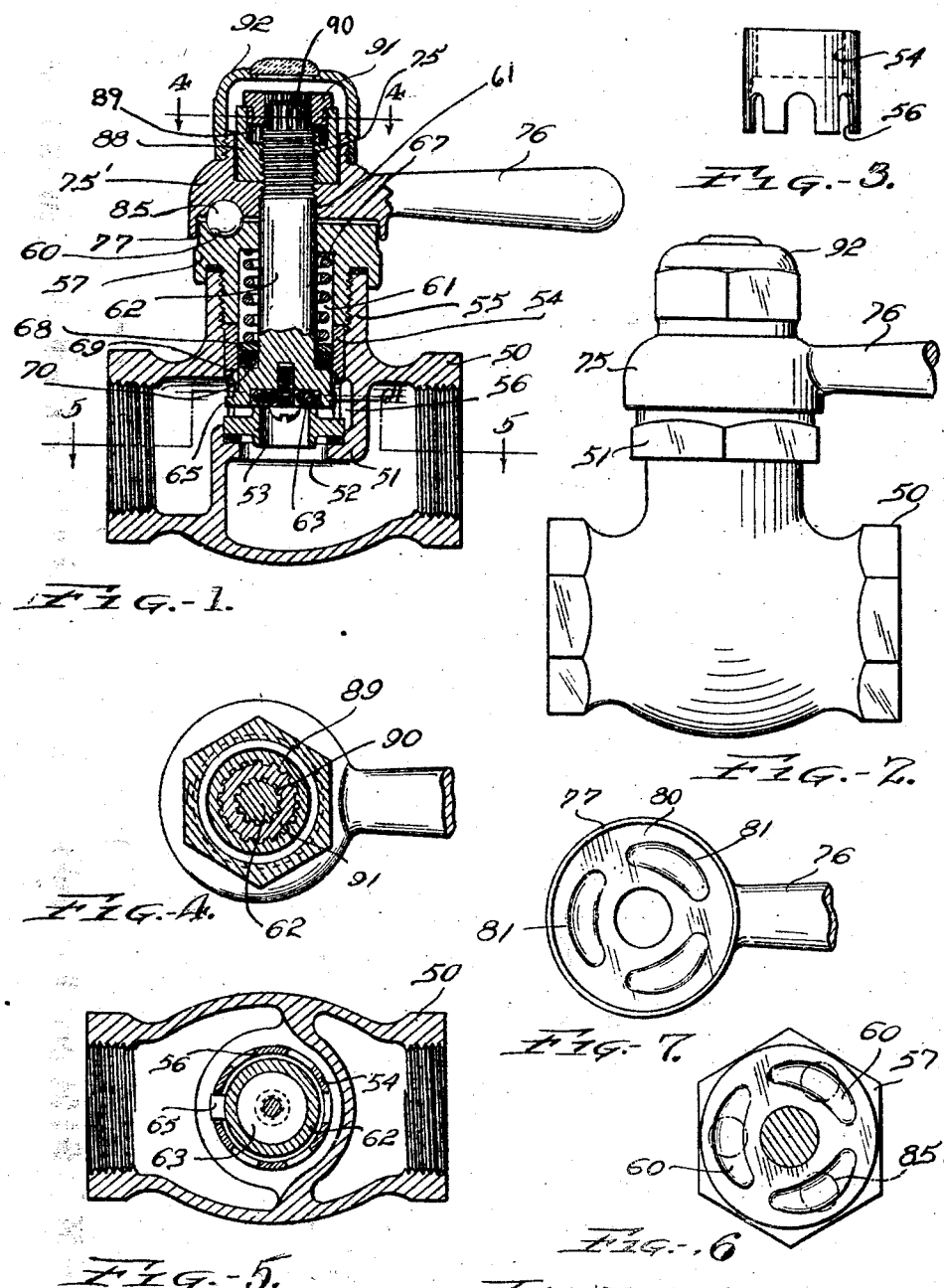

1,526,921

UNITED STATES PATENT OFFICE.

WILLIAM V. McNAMARA, OF CLEVELAND, OHIO.

VALVE.

Application filed March 2, 1922. Serial No. 540,602.

*To all whom it may concern:*

Be it known that I, WILLIAM V. McNAMARA, a citizen of the United States, residing at Cleveland, in the county of Cuyahoga and State of Ohio, have invented a certain new and useful Improvement in Valves, of which the following is a full, clear, and exact description, reference being had to the accompanying drawings.

This invention relates to valves, and has particular reference to valves such as are used in connection with water supply systems and for similar uses.

The general object of the invention is to provide a valve which is simple in construction, has but few parts and which can be easily and economically manufactured.

One of the objects of the invention is to provide a valve with a removable valve seat so constructed that should the seat become worn or corroded or otherwise unfit for use, it may be readily removed and turned over and replaced to provide a new valve seat surface and thereby avoid the necessity of using additional parts for repair.

An additional object of the invention is to provide an improved means for holding a removable valve seat in place so arranged that access may be quickly and readily had to the removable valve seat.

A further object of the invention is to provide a new and improved means for operating a valve to and from its valve seat.

Fig. 1 is a central longitudinal section through a valve made in accordance with my invention; Fig. 2 is an elevation of the valve shown in Fig. 1; Fig. 3 is an elevation of a valve seat holding member; Figs. 4 and 5 are sections taken on the correspondingly numbered lines respectively in Fig. 1; Fig. 6 is a fragmentary bottom view of a handle for operating the valve, and Fig. 7 is a top plan view of the closing cap for the valve casing.

Referring to the drawings by reference characters, 50 indicates the casing of a valve constructed according to my invention. The casing is shown as provided with the usual transverse partition 51 having an aperture 52 therein. The horizontally extending portion of the partition is indicated as recessed to receive a gasket thereon. It will be seen from the drawing that the gasket does not extend the full depth of the recess, thus allowing room for the reception of a removable valve seat 53. This valve seat comprises an annular portion having circular flanges 21 extending from each side thereof. From the description, it will be seen that the construction of the valve seat is such that should it become worn or corroded, it may be removed and turned over and a new wearing surface thus provided.

The valve member 53 is indicated as held in place by a sleeve 54 which is fitted within the cylindrical portion 55 on the casing. The sleeve 54 is provided with recesses 56 adjacent its lower portion to allow the passage of fluid while the upper end of the sleeve is abutted by a cap 57, which is threaded within the projection 55. The upper portion of the cap 57 is indicated as provided with a plurality of crescent-shaped apertures 60 best shown in Fig. 7. These apertures taper from each end to the middle, as well as increase in depth toward the middle for a purpose presently to be described.

The cap 57 is provided with a recess 61 in which a valve stem 62 operates. The valve stem 62 is provided with a suitable gasket 63. To prevent rotation of the valve stem 62 relative to the casing 50, I provide a projection 65 on the lower portion of the stem which enters one of the recesses 56. This enables the stem to be adjusted by an adjusting nut 88 which will be hereinafter described. Vertical movement of the stem may be limited by a flange 64 which extends around the valve near the bottom thereof and is adapted to engage a shoulder 69 in the sleeve 54.

The valve stem is normally urged to a position to close the valve by means of a spring 67 which rests on a collar 68. This collar 68 is spaced from the headed portion of the valve stem 62 and in the space thus provided, packing material 70 may be inserted.

The upper end of the valve stem 62 is threaded as at 75 and extending over this threaded portion, I show a cover 75' having a handle 76. The cover is provided with a skirt 77 which is indicated as adapted to fit over the cap 57. The cover 75' includes a plane portion 80 which is shown as provided with recesses 81. These recesses 81 are intended to be substantially complementary to and positioned opposite the recesses 60, with suitable spacing members, such as balls 85 fitting the recesses.

The cover is locked to the valve stem 62 by means of a nut 88 threaded on the end of the stem. This nut is provided with a recess in its outer extremity which recess is indicated as provided with longitudinally extending grooves 89 while the outer end of the stem 62 is provided with similar grooves 90. A locking collar 91 having an aperture therein has grooves on its outer and inner surfaces which are adapted to fit the grooves in the nut 88 and the valve stem 62 respectively so that when the collar 91 is pushed home, it will prevent relative rotation between the nut and the valve stem.

To prevent accidental removal of the locking collar 91, a suitable cap 92 may be threaded to the upper portion of the cover 75'.

From the foregoing description, it will be apparent that I have designed an improved valve structure which is extremely simple yet durable, and which is not likely to get out of order.

I claim:—

1. In a valve, the combination with a casing having a partition therein, of a reversible valve seat on the partition, a cage in close fitting engagement with the casing and engaging the valve seat to position it on the partition, a valve stem having a projection cooperating with the cage for preventing rotation of the stem, a cap in threaded engagement with the casing, and having a portion thereof extending into the casing and in abutting engagement with the cage, the cage and cap cooperating to provide a continuous chamber, a spring within the chamber and surrounding the stem for normally urging the valve stem into closed position, the spring having one end thereof engaging the cap, a handle embracing the stem, means intermediate the handle and cap for effecting axial movement of the stem with reference to the cap, said handle having a recess therein, a nut threaded on the stem and disposed within the recess and a fluted member engaging the stem and nut respectively for locking the nut to the stem, and a cover mounted on the handle for preventing movement of the member out of engagement with said nut and stem.

2. In a valve, the combination with a casing, of a valve seat carried thereby, a valve movable toward and away from the seat, a valve stem therefor, a handle embracing the stem outside the casing, said handle having a recess therein, a nut threaded on the stem and projecting beyond the recess, said nut also having a recess therein, the end of the stem and the recess within the nut being fluted, the fluted portions having substantially the same pitch and a sleeve loosely disposed within the space intermediate the stem and nut and being locked thereto by said fluted portions and an index cover in threaded engagement with the handle and extending over the sleeve, said cover being spaced from the sleeve sufficient only to prevent the sleeve from moving out of engagement with the nut and stem.

3. In a valve, the combination with a casing having a partition therein, of a valve seat on said partition, a valve stem having a valve fitted thereto, a spring surrounding the stem for urging the valve adjacent said seat, a cap for holding said spring in active position, a member engaged by said cap for holding the valve seat in position, a cover for said cap, a handle on said cover, a cooperating shoulder and recess on the valve and member respectively, and means for permitting vertical raising of the valve stem and preventing rotation during such raising movement.

4. A lock for a valve comprising in combination, a valve stem having a portion thereof threaded and having serrations on another portion thereof, a nut engaging the threads and having a flange spaced from the stem, said flange having serrations of substantially the same pitch as those on the stem, and an intermediate member cooperating with the serrations on the stem and nut respectively for preventing relative rotation between the stem and nut.

5. In combination, a casing, a valve seat carried thereby, a valve cooperating with the seat, a closure for the casing, a spring intermediate the closure and valve for normally urging it against the seat, a handle carried by the stem, a nut threaded on the stem for urging the handle toward the closure and a hollow locking member having similar serrations on the interior and exterior surface thereof, said member being disposed intermediate the nut and stem for preventing relative rotation therebetween after the nut is adjusted with respect to said handle.

6. In combination a casing having a partition therein, a reversible valve seat on the partition, a member having spaced openings providing water passageways adjacent the bottom thereof, a cap carried by the casing and engaging the top of said member and holding it in contact with the valve seat, a valve having a shoulder projecting into one of said recesses whereby the valve may be moved vertically with relation to the valve seat and may be prevented from rotating during such movement, a spring intermediate the valve member and cap, a valve stem projecting through the cap and having a portion thereof threaded, a handle extending over the stem, a nut threaded on the stem, and a member having serrations on the interior and exterior thereof, and cooperating with the nut and stem respectively, for preventing rotation of the nut relatively to said stem.

7. In a valve, the combination with a casing having a partition therein, of a reversible valve seat resting on the partition, a valve stem attached to said valve and projecting through the casing, means associated with the valve for permitting vertical movement while preventing rotation thereof relatively to the casing, the outer end of said stem being serrated, and the intermediate portion of said stem being threaded, a handle having an opening therein through which the stem projects and having a recess adjacent the top thereof, a nut threaded on the stem and entering the recess in the handle, said nut having an outwardly facing recess, the walls of said recess having serrations extending longitudinally of the stem, and a sleeve having serrations on the interior and exterior surface thereof, the interior serrations being complementary to those on the stem, and the exterior serrations being complementary to those on the nut, whereby the nut may be locked to the stem.

8. In combination, a casing having a partition therein, a reversible valve seat on the partition, a spacing member having spaced openings adjacent one end thereof, and having the bottom thereof engaging the valve seat, a cap carried by the casing and engaging the top of said member for holding it in contact with the valve seat, a valve having a shoulder projecting into one of said recesses whereby the valve may be moved vertically with relation to the valve seat and may be prevented from rotating during such movement, a spring intermediate the valve member and cap, a valve stem projecting through the cap and having the end thereof threaded, a handle having spaced recesses on the under side thereof and having an opening through which the stem extends, a plurality of balls disposed intermediate the handle and cap and serving to raise the valve when the handle is turned, a nut in threaded engagement with the stem for locking the handle thereto, said nut and stem having serrations extending longitudinally of the stem, and a sleeve having serrations on the interior and exterior thereof, the interior serrations cooperating with those on the stem, and the exterior serrations cooperating with those on the nut for locking the nut to said stem.

9. In a valve the combination with a valve seat, of a valve stem, a spring for normally holding said valve upon its seat, a cap holding said spring in place, said cap having a plurality of tapering apertures in its upper surface, a cover for the valve having substantially complementary apertures therein, balls disposed in said apertures, a nut threaded upon the upper end of the stem, said stem having fluted serrations on the outer surface and said nut having a cavity therein, said cavity having fluted serrations therein and a locking collar inserted in said cavity to prevent relative rotation between the nut and the valve stem.

10. A lock for a valve comprising in combination, a valve stem, a nut threaded thereon, and a member movable longitudinally of the stem for preventing relative rotation between the stem and nut, a handle, and a cap mounted on the handle and spaced from the member sufficiently to prevent the member from clearing the nut.

11. In combination, a valve stem, a member threaded thereon, said stem having a fluted portion beyond the threaded portion and means movable longitudinally of the stem within the fluted portion for preventing relative rotation between the nut and stem.

12. In combination, a valve stem having one end thereof fluted, a nut threaded on the stem and having a fluted recess therein, the fluted portions having substantially the same pitch and a member having an opening therein for engaging the stem, said member having the portions thereof engaging the stem and nut fluted so as to be complementary to the fluted portions on the stem and nut, respectively.

In testimony whereof, I hereunto affix my signature.

WILLIAM V. McNAMARA.